United States Patent [19]

Sabase et al.

[11] Patent Number: 5,401,519
[45] Date of Patent: Mar. 28, 1995

[54] LOW CALORIE COMPOSITE SWEETENER AND A METHOD OF MAKING IT

[75] Inventors: Eiichi Sabase, Funabashi; Masayuki Emura, Chiba; Owada Yuji, Kawagoe, all of Japan

[73] Assignee: Nisshin Seito Kabushiki Kaisha, Japan

[21] Appl. No.: 848,022

[22] Filed: Mar. 9, 1992

[51] Int. Cl.⁶ ............... A23L 1/227; A23L 1/236
[52] U.S. Cl. .................... 426/96; 426/548; 426/658
[58] Field of Search ............ 426/96, 598, 658

[56] References Cited

U.S. PATENT DOCUMENTS

| 4,824,681 | 4/1989 | Schobel et al. | 426/302 |
| 4,828,845 | 5/1989 | Zamudio-Jena et al. | 426/302 |
| 4,973,486 | 11/1990 | Matsumoto et al. | 426/658 |

FOREIGN PATENT DOCUMENTS

| 60-16572 | 1/1985 | Japan . |
| 60-256361 | 12/1985 | Japan . |
| 1-157354 | 6/1989 | Japan . |

OTHER PUBLICATIONS

Roger Grant, Claire Grant, Grant & Hackh's Chemical Dictionary, McGraw-Hill Co. fifth ed. 1989, p. 431.
English language translation of Document ID F1 Title: Process for Producing a Sweetener.
English language translation of Document ID F2 Title: Composite Sweetener Comprising Fructose and Asparteme as well as Production Process Therefor.
English language translation of Document ID F3 Title: Low Calorie Sweetener Composition.

*Primary Examiner*—Donald E. Czaja
*Assistant Examiner*—Mary S. Mims
*Attorney, Agent, or Firm*—Christensen, O'Connor, Johnson & Kindness

[57] ABSTRACT

A low calorie composite sweetener in which a sweetener of high sweetness is disposed by way of a non-reducing substance on the periphery of fructose particles. The low calorie composite sweetener is produced by forming a membrane of a non-reducing substance on the surface of fructose particles and depositing a sweetener of high sweetness on the membrane.

5 Claims, No Drawings

LOW CALORIE COMPOSITE SWEETENER AND A METHOD OF MAKING IT

BACKGROUND OF THE INVENTION

1. Field of the Invention

The present invention relates to a novel low calorie composite sweetener and a process for producing thereof.

2. Description of the Prior Art

Sweeteners include sugars such as sucrose, sugar-alcohols such as sorbitol and maltitol, protein series sweeteners, and chemically synthesized sweeteners such as saccharine. Among them, sugars, for example, sucrose. fructose and glucose are considered to be preferred sweeteners giving no peculiar taste and, in particular, sucrose is a sweetener having excellent quality of sweetness and physical property and in the greatest demand. However, in view of health and considering obesity caused by excess intake of sugars, adult diseases induced by obesity and occurrence of dental caries, it has recently been demanded for a low calorie sweetener as a substitute for sugar, and various low calorie sweeteners have been proposed.

Maltitol can be mentioned as a conventional and existing low calorie sweetener. However, maltitol involves problems, in that, for example, the quality of the sweetness is different from that of sucrose and it gives undesirable effect of laxative diarrhea, if it is taken in a great amount.

Further, sweeteners of high sweetness which provide sufficient sweetness even in a small amount have also been used and there are known, for example, stevia extracts and ($\alpha$-L-aspaltyl-L-phenylalanine methyl ester (hereinafter referred to as AP). However, it has been pointed out that such sweeteners of high sweetness have drawbacks that they generally give peculiar after-taste and lack in the voluminous feeling if they are used alone, and adjustment of sweetness is difficult owing to their high sweetness. Then, it has been proposed to use them as a composite sweetener in combination with other sugars in order to compensate for such drawbacks (Japanese Patent Laid-Open Publications No. 60(1985)-16572, No. 60(1985)-256361 and No. 1(1989)-157354).

Such conventional processes for producing composite sweeteners were for blending AP with sugars as described in the above referenced prior art which adopt a method of manufacturing products in such a form that a reducing sugar or a sugar containing reducing sugar in the molecule is in direct contact with AP. Because of this method, it involves the problem of occurrence of Mailard reaction to bring about coloration in the course of drying or advancement of coloration during storage.

OBJECT AND SUMMARY OF THE INVENTION

It is, therefore, an object of the present invention to overcome the foregoing problems of the prior art and provide a composite sweetener causing less coloration in the course of drying and during storage, and capable of being produced efficiently. Another object of the invention is to provide a process for producing such a composite sweetener.

The foregoing objects of the present invention can be achieved by a low calorie composite sweetener in which a sweetener of high sweetness is disposed by way of a non-reducing substance to the periphery of fructose particles.

DESCRIPTION OF THE INVENTION

The composite sweetener according to the present invention can be produced by a process of forming a membrane of a non-reducing substance at the surface of fructose particles and depositing a sweetener of high sweetness, such as a protein series sweetner on the membrane.

In this process it is preferable that a moistened membrane of non-reducing substance is formed on the surface or fructose particles by spraying an aqueous solution of the non-reducing substance to the fructose particles, depositing a powdery sweetener of high sweetness on the membrane and then drying them.

Fructose may be crystalline or granular with an average grain size of about 24 to 60 mesh, preferably, 42 to 48 mesh.

For the non-reducing substance, sugar-alcohols are preferred. As sugar-alcohols, one or more of xylytol, sorbitol, maltitol, mannitol, lactitol, palatinitol and erythritol can be used. In case of spraying the aqueous solution of the non-reducing substance to the fructose particles, it is desirable that the concentration of the non-reducing substance is as high as possible which is sufficient to allow spraying, in order to improve the membrane forming efficiency.

Thickness of the membrane of the non-reducing substance is so determined as to substantially inhibit the contact between the fructose and the sweetener of high sweetness. Spraying may be conducted at a normal temperature but also at a lower temperature or in an elevated temperature atmosphere.

For the sweetener of high sweetness, there can be used, in addition to the above-mentioned AP and stevia extract, other sweeteners such as synthesized stevioside, transferred sugar stevioside, rebaudioside, transferred sugar rebaudioside, saccharine, acesulfame-K. The grain size of the sweetener of high sweetness may be within a range from 60 to 400 mesh but a powder of 100 to 250 mesh is desirable. The powdery sweetener of high sweetness is added and mixed while the non-reducing substance membrane formed at the surface of the fructose particles is in a moistened state, and sufficiently stirred and deposited uniformly. An additional amount of the sweetener of high sweetness to be added differs depending on the sweetness of the sweetener and can be adjusted optionally in accordance with the required sweetness.

There are no particular restrictions on the drying conditions so long as the conditions do not denature the composite sweetness, but drying is desirably conducted by blowing a hot air at 50° to 60° C.

In the composite sweetener according to the present invention, the nonreducing substance is interposed between the fructose and the sweetener of high sweetness disposed at the periphery of fructose, and, consequently, the direct contact between the fructose and the sweetener of the high sweetness can be inhibited, to suppress them from reaction, which would otherwise cause coloration or the like, and, thereby to provide a stable composite sweetener having respective inherent characteristics combined together. Further, while fructose has a problem of extremely high hygroscopicity, the composite sweetener according to the present invention is extremely stable to moisture in air, because fructose is coated.

In the process for producing the composite sweetener according to the present invention, an aqueous solution of the non-reducing substance is sprayed to form a membrane of the non-reducing substance to the surface of the fructose particles, and, as a result, fructose is not dissolved but a moistened membrane can be formed on the surface while maintaining the shape thereof. Since fructose is hydrophilic, it may possibly be dissolved in a portion of a water content in the aqueous solution of the non-reducing substance and leached to the surface of the non-reducing substance membrane, but such undesirable phenomenon can be prevented completely by properly adjusting the concentration or the non-reducing substance or using an aqueous solution of the non-reducing substance together with a powder of the non-reducing substance. Particularly, such combined use of aqueous solution and powdery non-reducing substances is more effective in respect of preventing the particles from adhering to each other and improvement in the drying property.

Since the thick aqueous solution of a sugar alcohol as a non-reducing substance has a tackiness and can deposit a desired amount of the powdery sweetener of high sweetness, the sweetness of the composite sweetener in the final product can be adjusted over a wide range.

PREFERRED EMBODIMENTS OF THE INVENTION

Examples of the present invention will be discussed below.

EXAMPLE 1

500 g of fructose crystals were charged in a rotary can and 13 g of an aqueous 60% solution of maltitol was sprayed while rotating the rotary can to form a maltitol membrane on fructose crystals at a normal temperature. Subsequently, 10 g of AP was charged and sufficiently mixed with maltitol-coated fructose to deposit AP on the surface of the maltitol-coated fructose particles. Then drying was conducted by blowing a hot air at 60° C., thereby 502.8 g of a fructose-AP composite sweetener was obtained.

When the sweetness of this sweetener was compared with that of an aqueous 10% sucrose solution by a functional test, the sweetness was five times as high as that of sucrose.

EXAMPLE 2

500 g of fructose crystals were charged in a rotary can and, while rotating the rotary can, 9 g of an aqueous 60% maltitol solution was sprayed and, subsequently, 3 g of powdery maltitol was added and the mixture was put to rolling for one min. Then 8 g of an aqueous 60% maltitol solution was again sprayed and, further, 3 g of powdery maltitol was added and the mixture was put to rolling for one min. Then, 15 g of AP was charged and put to rolling for 2 min., and drying was conducted by blowing a hot air at 60° C., thereby 516.3 g of a fructose-AP composite sweetener was obtained.

When the sweetness of this sweetener was compared with that of an aqueous 10% sucrose solution by a functional test, the sweetness was seven times as high as that of sucrose.

Control 500 g of fructose crystals were charged in a rotary can and while rolling in the rotary can, 4 g of water was sprayed and then 10 g of AP was added and put to rolling for 5 min. Subsequently, drying was conducted by blowing a hot air at 50° C. for 40 min., and 496.7 g of dried product was obtained.

When the sweetness of this sweetener was compared with that of an aqueous 10% sucrose solution by a functional test, the sweetness was five times as high as that of sucrose.

Measurement for Color Values immediately after production

When color values were measured for the composite sweeteners prepared in Examples 1 and 2, and the Control, remarkable coloration was recognized in the control in which the formation of the non-reducing substance membrane was not applied, as shown in Table 1.

TABLE 1

| Sample | Color Value |
| --- | --- |
| Example 1 | 8.6 |
| Example 2 | 8.6 |
| Control | 17.0 |

Measurement for Color Values after storage

Composite sweeteners prepared by the processes of Examples 1 and 2 and the Control were tightly sealed each in a bag made of polypropylene, stored in a thermostable drier adjusted to 40° C. for 15 days, one month and three months, respectively. When their color values were measured, it was recognized that progress of coloration was remarkably retarded in the samples obtained by the processes of Examples 1 and 2 as compared with the Control in which fructose and AP were in direct contact, as shown in Table 2.

TABLE 2

| Period | Samples | | |
| --- | --- | --- | --- |
| | Example 1 | Example 2 | Control |
| 15 days | 18.3 | 19.5 | 34.0 |
| one month | 33.3 | 35.7 | 61.2 |
| three months | 38.6 | 42.1 | 82.6 |

As has been described above, in the composite sweetener according to the present invention, fructose is coated with the non-reducing substance, and, consequently, coloration occurs less in the course of drying and during storage, to provide an excellent sweetener which has advantages of respective inherent characteristics of fructose and sweetener of high sweetness. Further, since the process according to the present invention is extremely efficient and can optionally adjust the deposit amount of the sweetener of high sweetness, it is possible to produce a composite sweetener having a predetermined sweetness in a short period of time, conveniently and easily.

We claim:

1. A low calorie composite sweetener in which a dipeptide or protein series sweetener is disposed by way of a non-reducing substance on the periphery of fructose particles.

2. A low calorie composite sweetener as defined in claim 1, wherein the non-reducing substance is a sugar-alcohol.

3. A process for producing a low calorie composite sweetener comprising the steps of:

forming a membrane of a non-reducing substance on the surface of fructose particles, and depositing a dipeptide or protein series sweetener on said membrane.

4. A process for producing a low calorie composite sweetener comprising the steps of:

spraying an aqueous solution of a non-reducing substance onto fructose particles thereby forming a moistened of the non-reducing substance on the surface of the fructose particles, depositing a powdery dipeptide or protein series sweetener on said membrane, and subjecting it to drying.

5. A process for producing a low calorie composite sweetner as defined in claim 3 or 4, wherein the non-reducing substance is a sugar-alcohol.

* * * * *

UNITED STATES PATENT AND TRADEMARK OFFICE
CERTIFICATE OF CORRECTION

PATENT NO. : 5,401,519
DATED : March 28, 1995
INVENTOR(S) : E. Sabase et al.

It is certified that error appears in the above-indentified patent and that said Letters Patent is hereby corrected as shown below:

| COLUMN | LINE | |
|---|---|---|
| 1 | 6 | Field of the Invention" should read --Field of the Invention-- |
| 1 | 10 | Description of the Prior Art" should read --Description of the Prior Art-- |
| 1 | 15 | "sucrose." should read --sucrose,-- |
| 2 | 13 | "or" should read --of-- |
| 6 (Claim 4, | 1 line 5) | "moistened of" should read --moistened membrane of-- |
| 6 (Claim 5, | 6 line 2) | "sweetner" should read --sweetener-- |

Signed and Sealed this

Fourth Day of July, 1995

*Attest:*

BRUCE LEHMAN

*Attesting Officer*     *Commissioner of Patents and Trademarks*